US012632195B2

(12) United States Patent
Arikawa et al.

(10) Patent No.: US 12,632,195 B2
(45) Date of Patent: May 19, 2026

(54) COMPUTER SYSTEM AND CONTROL METHOD THEREFOR

(71) Applicant: NTT, Inc., Tokyo (JP)

(72) Inventors: Yuki Arikawa, Tokyo (JP); Naoki Miura, Tokyo (JP); Kenji Tanaka, Tokyo (JP); Tsuyoshi Ito, Tokyo (JP); Takeshi Sakamoto, Tokyo (JP); Yusuke Muranaka, Tokyo (JP)

(73) Assignee: NTT, INC., Tokyo (JP)

( * ) Notice: Subject to any disclaimer, the term of this patent is extended or adjusted under 35 U.S.C. 154(b) by 0 days.

(21) Appl. No.: 18/699,160

(22) PCT Filed: Nov. 12, 2021

(86) PCT No.: PCT/JP2021/041778
§ 371 (c)(1),
(2) Date: Apr. 5, 2024

(87) PCT Pub. No.: WO2023/084749
PCT Pub. Date: May 19, 2023

(65) Prior Publication Data
US 2025/0238158 A1    Jul. 24, 2025

(51) Int. Cl.
*G06F 3/06*    (2006.01)

(52) U.S. Cl.
CPC .......... *G06F 3/0652* (2013.01); *G06F 3/0604* (2013.01); *G06F 3/0673* (2013.01)

(58) Field of Classification Search
CPC ..... G06F 3/0652; G06F 3/0604; G06F 3/0673
See application file for complete search history.

(56) References Cited

U.S. PATENT DOCUMENTS

| | | | | |
|---|---|---|---|---|
| 10,282,926 | B2 * | 5/2019 | Deville | ............... G06F 11/3055 |
| 2006/0215525 | A1 * | 9/2006 | Oyama | ................... H04L 69/28 |
| | | | | 369/59.19 |
| 2010/0322237 | A1 * | 12/2010 | Raja | .................... H04L 63/1433 |
| | | | | 370/389 |
| 2022/0342794 | A1 * | 10/2022 | Tsuchikawa | ........ G06F 11/3476 |

OTHER PUBLICATIONS

Nippon Telegraph and Telephone Corporation, "NTT Technology Report for Smart World 2020," May 28, 2020, 28 pages.
Takano et al., "Flow-centric Computing Leveraged by Photonic Circuit Switching for the Post-Moore Era," 2016 Tenth IEEE/ACM International Symposium on Networks-on-Chip (NOCS), Aug. 31, 2016, 3 pages.

* cited by examiner

*Primary Examiner* — Bryce P Bonzo
*Assistant Examiner* — Audrey Emma Whitesell
(74) *Attorney, Agent, or Firm* — Slater Matsil, LLP

(57) ABSTRACT

An embodiment is a method for controlling a computer system including a plurality of calculators and a host, each of the plurality of calculators having a trace buffer, the method including triggering by detection of a predetermined event from input data to record a detection time of the event acquired for each type of the input data in the trace buffer, determining, by the host or the calculator, the type of the input data to which the detection time of the event recorded in the trace buffer belongs, and recording, by the host or the calculator, according to a determination result, a latest detection time of the event among the detection times of the event belonging to the same type of the input data, and erases detection times of the event other than the latest detection time of the event.

3 Claims, 13 Drawing Sheets

Fig. 7A

| Timestamp:Dec, | Timestamp:0x, | Ins, | Evt, | Dec, | TID | , | EventData |
|---|---|---|---|---|---|---|---|
| 6983, | 1b47, | f0, | 07, | HLR-, | 00000000, | | 00000000 |
| 6996, | 1b54, | f1, | 07, | HLR-, | 00000000, | | 00000000 |
| 401563, | 6209b, | f0, | 05, | H-R-, | 00000001, | | 00000000 |
| 401564, | 6209c, | 10, | 05, | H-R-, | 00000001, | | 00000000 |
| 401656, | 620f8, | 11, | 05, | H-R-, | 00000001, | | 00000000 |
| 402995, | 62633, | f1, | 05, | H-R-, | 00000000, | | 00000000 |
| 404019, | 62a33, | f1, | 06, | -LR-, | 00000000, | | 00000000 |
| 418315, | 6620b, | f1, | 05, | H-R-, | 00000000, | | 00000000 |
| 419339, | 6660b, | f1, | 06, | -LR-, | 00000000, | | 00000000 |
| 428625, | 68a51, | f1, | 05, | H-R-, | 00000000, | | 00000000 |
| 429649, | 68e51, | f1, | 06, | -LR-, | 00000000, | | 00000000 |
| 438909, | 6b27d, | f1, | 05, | H-R-, | 00000000, | | 00000000 |
| 439933, | 6b67d, | f1, | 06, | -LR-, | 00000000, | | 00000000 |
| 448499, | 6d7f3, | f1, | 05, | H-R-, | 00000000, | | 00000000 |
| 449523, | 6dbf3, | f1, | 06, | -LR-, | 00000000, | | 00000000 |
| 457367, | 6fa97, | f1, | 05, | H-R-, | 00000000, | | 00000000 |
| 458391, | 6fe97, | f1, | 06, | -LR-, | 00000000, | | 00000000 |
| 466369, | 71dc1, | f1, | 05, | H-R-, | 00000000, | | 00000000 |
| 467393, | 721c1, | f1, | 06, | -LR-, | 00000000, | | 00000000 |
| 475235, | 74063, | f1, | 05, | H-R-, | 00000000, | | 00000000 |
| 476259, | 74463, | f1, | 06, | -LR-, | 00000000, | | 00000000 |
| 484240, | 76390, | f1, | 05, | H-R-, | 00000000, | | 00000000 |
| 485264, | 76790, | f1, | 06, | -LR-, | 00000000, | | 00000000 |
| 493267, | 786d3, | f1, | 05, | H-R-, | 00000000, | | 00000000 |
| 494291, | 78ad3, | f1, | 06, | -LR-, | 00000000, | | 00000000 |
| 502432, | 7aaa0, | f1, | 05, | H-R-, | 00000000, | | 00000000 |
| 503456, | 7aea0, | f1, | 06, | -LR-, | 00000000, | | 00000000 |
| 511523, | 7ce23, | f1, | 05, | H-R-, | 00000000, | | 00000000 |
| 512547, | 7d223, | f1, | 06, | -LR-, | 00000000, | | 00000000 |
| 520549, | 7f165, | f1, | 05, | H-R-, | 00000000, | | 00000000 |
| 521573, | 7f565, | f1, | 06, | -LR-, | 00000000, | | 00000000 |
| 529688, | 81519, | f1, | 05, | H-R-, | 00000000, | | 00000000 |
| 530712, | 81919, | f1, | 06, | -LR-, | 00000000, | | 00000000 |
| 538726, | 83866, | f1, | 05, | H-R-, | 00000000, | | 00000000 |
| 539750, | 83c66, | f1, | 06, | -LR-, | 00000000, | | 00000000 |
| 547790, | 85bce, | f0, | 06, | -LR-, | 00000001, | | 00000000 |
| 547791, | 85bcf, | 10, | 06, | -LR-, | 00000001, | | 00000000 |
| 547794, | 85bd2, | 11, | 06, | -LR-, | 00000001, | | 00000000 |
| 547796, | 85bd4, | f1, | 05, | H-R-, | 00000000, | | 00000000 |
| 548820, | 85fd4, | f1, | 06, | -LR-, | 00000000, | | 00000000 |

41

42

COMPUTER SYSTEM AND CONTROL METHOD THEREFOR

CROSS-REFERENCE TO RELATED APPLICATIONS

This patent application is a national phase filing under section 371 of PCT/JP2021/041778, filed Nov. 12, 2021, which application is hereby incorporated herein by reference in its entirety

TECHNICAL FIELD

The present invention relates to a computer system having a plurality of calculation units and a control method therefor.

BACKGROUND

Technological innovation is progressing in many fields such as machine learning, artificial intelligence (AI), and the IoT (Internet of Things), and by utilizing various pieces of information and data, the sophistication of services and the provision of added value are being actively carried out. Such processing requires a large amount of calculation, and an information processing infrastructure for the calculation is essential.

For example, in NPL 1, an attempt is being made to update the existing information processing infrastructure, but current computers cannot cope with the rapidly increasing amount of data. It points out that "post-Moore technology" that transcends Moore's law must be established in order to make progress in the future.

As a post-Moore technology, for example, NPL 2 discloses a technique called flow-centric computing. Flow-centric computing introduces the new concept of moving data to where the computing power resides and processing data, rather than the traditional computing idea of processing data where the data resides.

In order to realize flow-centric computing, it is necessary not only to have a broadband communication network for data movement, but also to efficiently control computational resources in order to obtain the desired calculation performance.

CITATION LIST

Non Patent Literature

[NPL 1] "NTT Technology Report for Smart World 2020," Nippon Telegraph and Telephone Corporation, 2020. https://www.rd.ntt/_assets/pdf/techreport/NTT_TRFSW_2020_EN_W.pdf.
[NPL 2] R. Takano and T. Kudoh, "Flow-centric computing leveraged by photonic circuit switching for the post-moore era," Tenth IEEE/ACM International Symposium on Networks-on-Chip (NOCS), Nara, 2016, pp. 1-3. https://ieeexplore.ieee.org/abstract/document/7579339.

SUMMARY

Technical Problem

However, in a computer system in which a plurality of calculation units are interlocked, it has been difficult to identify a fault that has occurred within a calculation unit because the calculation units independently move data without going through a host unit.

In addition, it was difficult to grasp the internal state of the computer system, such as identifying the calculation unit through which the input data passed at a certain time.

Solution to Problem

In order to solve the above-described problems, a method for controlling a computer system according to embodiments of the present invention is a method for controlling a computer system including a plurality of calculation units and a host unit, each of the plurality of calculation units having a trace buffer, the computer system being triggered by detection of a predetermined event from input data to record a detection time of the event acquired based on an operating frequency of the calculation unit for each type of the input data in the trace buffer, the method including: a step in which either the host unit or the calculation unit determines the type of the input data to which the detection time of the event recorded in the trace buffer belongs; and a step in which according to a determination result, either the host unit or the calculation unit records a latest detection time of the event among the detection times of the event belonging to the same type of the input data, and erases detection times of the event other than the latest detection time of the event.

A method for controlling a computer system according to embodiments of the present invention is a method for controlling a computer system in which each of a plurality of calculation units has a calculator and a trace buffer, the computer system being triggered by detection of a predetermined event from input data to record a detection time of the event acquired based on an operating frequency of the calculation unit in the trace buffer, the method including: a step in which a calculator of one of the plurality of calculation units processes the input data and transfers the input data to a calculator of another calculation unit; a step in which the other calculation unit transmits a reception completion notification; and a step in which, upon receiving the reception completion notification, the one calculation unit erases the detection time of the event recorded in the trace buffer of the one calculation unit.

A method for controlling a computer system according to embodiments of the present invention is a method for controlling a computer system in which each of a plurality of calculation units has a calculator and a trace buffer, the computer system being triggered by detection of a predetermined event from input data to record a detection time of the event acquired based on an operating frequency of the calculation unit in the trace buffer, the method including: erasing the detection time of the event recorded in the trace buffer when a predetermined time has elapsed.

A computer system according to the present invention is a computer system for processing input data, including: a plurality of calculation units; and a host unit connected to the plurality of calculation units to control the plurality of calculation units, wherein the processed data is transferred between the plurality of calculation units, the calculation unit includes a trace buffer that records trace data upon detection of a predetermined event from the input data, the trace data has a timestamp value that is the detection time of the event based on the operating frequency of the calculation unit, and either the host unit or the calculation unit erases the trace data recorded in the trace buffer under a predetermined condition.

Advantageous Effects of Invention

According to the present invention, it is possible to provide a computer system and a control method therefor that can easily identify the location of a fault and grasp the internal data status at the time of the fault.

BRIEF DESCRIPTION OF THE DRAWINGS

FIG. 7A is a diagram for explaining an example of a computer system control method according to the first embodiment of the present invention.

DETAILED DESCRIPTION OF ILLUSTRATIVE EMBODIMENTS

First Embodiment

A computer system and a control method therefor according to the first embodiment of the present invention will be described with reference to FIGS. 1 to 3.

<Computer System Configuration>

Figure 1:
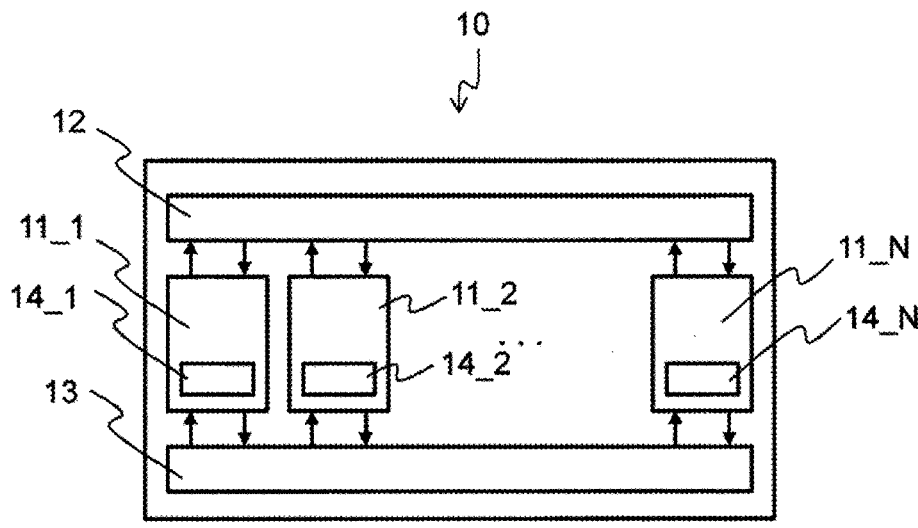
FIG. 1 is a block diagram showing the configuration of a computer system according to a first embodiment of the present invention.

As shown in FIG. 1, a computer system 10 according to the present embodiment includes N calculation units 11_1 to 11_N (N is an integer equal to or greater than 1), an internal communication unit 13 that connects the calculation units 11_1 to 11_N, and a host unit 12 that sets and manages operation parameters for the calculation units 11_1 to 11_N.

The calculation units 11_1 to 11_N are configured by processors, accelerators, or the like, and include trace units 14_1 to 14_N.

When the calculation units 11_1 to 11_N are interlocked, the trace units 14_1 to 14_N are triggered by detection of a predetermined event at an arbitrary observation point of each of the calculation units 11_1 to 11_N, and record an event detection time based on the operating frequency of each of the calculation units 11_1 to 11_N.

Here, the trace units 14_1 to 14_N can record the event detection time for each data type or event type. Furthermore, arbitrary data may be recorded.

In interlocking of the calculation units 11_1 to 11_N, the data processed by the calculation unit 11_1 is transferred to the calculation unit 11_2 via the internal communication unit 13. Subsequently, the data transfer is repeated, and the data is transferred to the calculation unit 11_N.

As a method for interlocking the calculation units 11_1 to 11_N, there are a processing method in which a plurality of calculation units are connected in series, a processing method in which a plurality of calculation units are connected in parallel, a processing method in which both are combined, and the like. A desired service is provided and an application is processed by interlocking a plurality of calculation units.

The calculation units 11_1 to 11_N (N is an integer equal to or greater than 1) have a function of executing predetermined calculation processing on input data input from the outside of the computer system 10. Calculation processing is, for example, general calculation processing such as processing, aggregation, and combination of input data, such as processing to reduce/enlarge the image size when image data is input, processing to detect a specific object from the image data, or processing to decrypt/encrypt the image data.

Moreover, the calculation units 11_1 to 11_N may be added to or deleted regardless of whether the system is stopped or in operation. For example, they can be realized by using an FPGA, which is a dynamically reconfigurable device, for only a part of a calculator. Furthermore, as a method for mounting the calculation units 11_1 to 11_N, an accelerator card having a dedicated circuit specialized for specific calculation may be added. Moreover, it is also possible to provide a plurality of calculators that provide calculation functions in the calculation unit.

The host unit 12 has a function of setting and managing operation parameters for the calculation units 11_1 to 11_N, and more specifically has a function of controlling the calculation units 11_1 to 11_N and a function of storing data. The operation parameters are, for example, information for specifying an algorithm when switching between a plurality of algorithms in image processing, such as coefficients and thresholds in calculation processing.

In addition, in a case where a calculation unit can be added to or deleted even after the system has started operating, the host unit 12 performs management of the entire computer system 10, such as setting circuit information for executing desired processing content in the calculation unit.

The internal communication unit 13 has a communication function for connecting the calculation units 11_1 to 11_N and exchanging data among the calculation units 11_1 to 11_N. Specifically, commercial communication standards such as PCIe and Ethernet and physical configurations that satisfy the communication standards, that is, PCIe switches and Ethernet switches, can be mentioned.

Furthermore, when a plurality of calculators providing calculation functions are provided in the calculation units 11_1 to 11_N, a plurality of observation points may be provided in the calculation units 11_1 to 11_N.

<Configuration of Calculation Unit>

Figure 2:
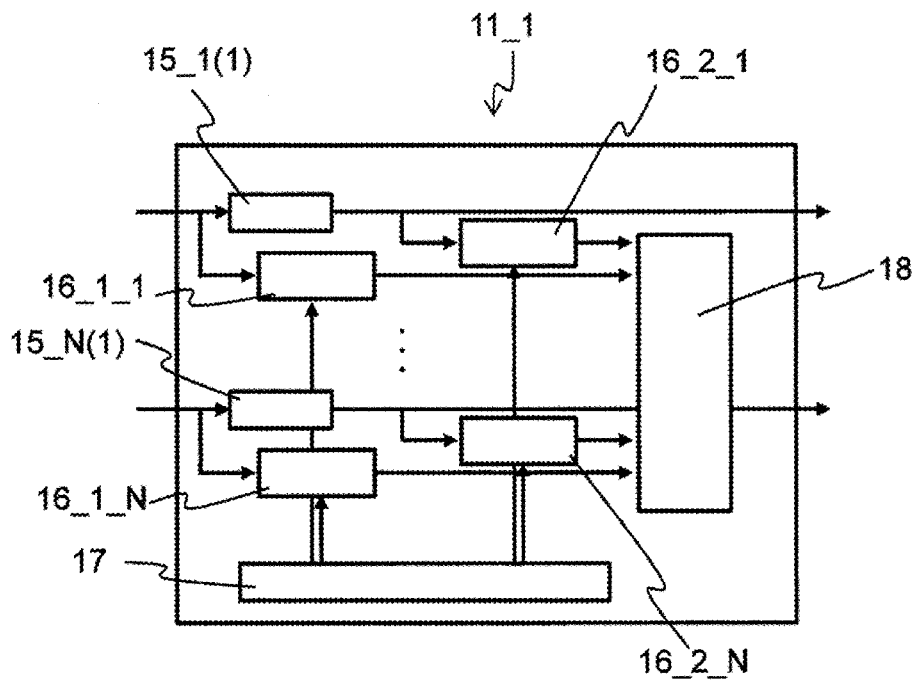
FIG. 2 is a block diagram showing the configuration of a calculation unit in the computer system according to the first embodiment of the present invention.

The calculation unit 11_1 in the computer system 10 includes, as shown in FIG. 2, a plurality (N units) of calculators 15_1(1) to 15_N(1) and a trace unit 14_1. Here, the number of calculators may be one.

The trace unit 14_1 includes event generators 16_1_1 to 16_2_N, a timestamp unit 17, and a trace buffer 18.

The event generators 16_1_1 to 16_2_N are connected to the input side and the output side of the calculators 15_1(1) to 15_N(1), respectively. The output of the timestamp unit 17 is connected to event generators 16_1_1 to 16_2_N. Outputs of the event generators 16_1_1 to 16_2_N are connected to the trace buffer 18.

Here, the event generators 16_1_1 to 16_2_N may be arranged either on the input side or the output side of the calculators 15_1(1) to 15_N(1), and may be arranged at any location, and it is sufficient that at least one unit is arranged. Furthermore, a plurality of trace buffers 18 may be arranged, and it is sufficient that at least one unit is arranged.

The event generators 16_1_1 to 16_2_N are inserted in arbitrary positions of the calculation units 11_1 to 11_N to detect events (beginning and end of stream) for each type of data (user ID, session ID, stream ID, service ID) and generate a trigger for recording trace data including the detection time (hereinafter referred to as "timestamp value") in the trace buffer 18, which will be described later.

Furthermore, the type of data is not limited to the above, and any information that can be used for organizing data, such as header information of packets used for organizing data and information possessed by signals running in parallel with data, can be applied.

The timestamp unit 17 has at least one clock counter, synchronizes the plurality of event generators 16_1_1 to 16_2_N (observation points), and acquires the time with the accuracy of the operating frequency of the calculation units 11_1 to 11_N. Here, the operating frequency (clock frequency) of the calculation units 11_1 to 11_N is usually about several nanoseconds when the function is realized using an FPGA (field-programmable gate array).

The trace buffer 18 records trace data triggered by event detection by the event generators 16_1_1 to 16_2_N. Here, the trace data includes each detection time (timestamp value) acquired from the timestamp unit 17, an instance ID, an event type (event ID), a data type (TID), and arbitrary data. Here, the trace data may have at least a timestamp value.

Furthermore, the trace buffer 18 provides a constant amount of buffer, independent of the number of event generators.

Here, the timestamp value is a value that is unified within the calculation unit (FPGA).

The instance ID is an ID that distinguishes an event generator and an instance and indicates the location (observation point) where the event is detected.

The event type (event ID) is an ID that distinguishes event contents. For example, the distinction is made based on the passing of the beginning of a stream or the passing of the end of a stream. Furthermore, an event detection flag or the like is prepared at an arbitrary location of the data to detect that the flag has passed.

Arbitrary data is data that is usually processed by a computer system, such as image data, numerical data, and text data.

The data type is used to identify and classify attributes of input data, for example, and is information attached to the data itself, such as user ID, session ID, stream ID, and service ID. Furthermore, the information for identifying the data type does not necessarily have to be added to the header of a packet, and may be uniquely defined in the payload of a packet, for example. Furthermore, when a signal running parallel to data is used inside the calculation unit, the parallel running signal may be used to acquire the data type.

6

<Operation of Computer System>

The operation of the computer system 10 according to the present embodiment will be described below.

In the calculation unit 11_1 of the computer system 10, data is input to the calculators 15_1(1) to 15_N(1). Input data is composed of various elements, and includes an event type (event ID), a data type (TID), and arbitrary data.

Here, the data processed by the calculator 15_1(1) of the calculation unit 11_1 is transmitted and input to the calculator 15_1(2) of the calculation unit 11_2.

In the event generators 16_1_1 to 16_2_N, first, control signals (operations) of data to be input to the calculation units 11_1 to 11_N are observed.

When the event generators 16_1_1 to 16_2_N detect an event, the event generators 16_1_1 to 16_2_N acquire the event type, data type, and arbitrary data from the input data. Here, an event occurs, for example, when the beginning of a stream has passed or when the beginning of a stream has passed.

The event generators 16_1_1 to 16_2_N add the instance ID and the timestamp value transmitted from the timestamp unit 17 to the acquired event type, data type and arbitrary data. As a result, the trace data is composed of a timestamp value, an instance ID, an event type, a data type, and arbitrary data.

Here, the trace data may include at least a timestamp value, and information in the computer system such as a processing time and a data flow rate can be grasped based on the timestamp value. Furthermore, the time when a trouble occurred can be grasped.

Furthermore, the trace data has an instance ID, so it is possible to grasp the location where the trouble occurred.

In addition, the trace data has an event type, so that it is possible to grasp the time when an event occurred.

In addition, the trace data has a data type, so that it is possible to grasp the operation status for each data type and use it for determination (described later) when erasing data.

In addition, trace data has arbitrary data, so that it can be used when processing is restarted (described later).

In addition, trace data has service priority information, so that it can be used for management of trace data based on priority.

Finally, the event generators 16_1_1 to 16_2_N send trace data to the trace buffer 18.

Furthermore, the timestamp unit 17 receives (writes) the count start or stop setting transmitted from the host unit 12.

Triggered by this, the start or stop of counting is set to a clock counter.

Counting is started by the count start setting, and the counting is executed based on the operating frequencies of the respective calculation units 11_1 to 11_N. On the other hand, counting is stopped by the count stop setting.

When the event generators 16_1_1 to 16_2_N detect an event, the time counted by the clock counter is read as a timestamp value, and the timestamp value is transmitted to the event generators 16_1_1 to 16_2_N.

In addition, event detection is determined by, for example, using ON/OFF of a signal that indicates whether the data is valid among the signals that run in parallel with the data. Alternatively, a field for event detection is prepared in a specific area of the data, and an event is detected by using the bit string of the field.

Here, synchronization is performed between the calculation units (FPGA) as necessary. As a method for synchronizing the calculation units, synchronization is achieved by inputting a signal for synchronization or a reset signal from the host unit to the calculation units to be synchronized.

Furthermore, when reading trace data from the trace buffer 18, the host unit 12 sends a reset signal to the timestamp unit 17 to reset the value of the clock counter.

In the trace buffer 18, the trace data received from the event generators 16_1_1 to 16_2_N are recorded and accumulated in the trace buffer 18.

Here, the trace data transmitted from a plurality of event generators 16_1_1 to 16_2_N are recorded. In addition, writing and reading of trace data are executed by FIFO (First-In First-Out) common to all TIDs.

Next, the host unit 12 reads the trace data from the trace buffer 18.

Finally, the host unit 12 executes post-processing of the read (collected) data. For details, search (GREP) is performed for each TID. Subsequently, the search results are visualized after being sorting by the timestamp unit 17.

Here, an example is shown in which the event generator acquires the event type, data type, and arbitrary data from the input data when an event is detected. Even if the event type, data type, and arbitrary data are not acquired, the computer system 10 can be operated when at least the timestamp value is acquired as described above.

<Addition and Deletion of Calculation Unit and Calculator>

In the computer system 10, the calculation units 11_1 to 11_N can be added to or deleted regardless of whether the computer system 10 is stopped or in operation.

Figure 3A:
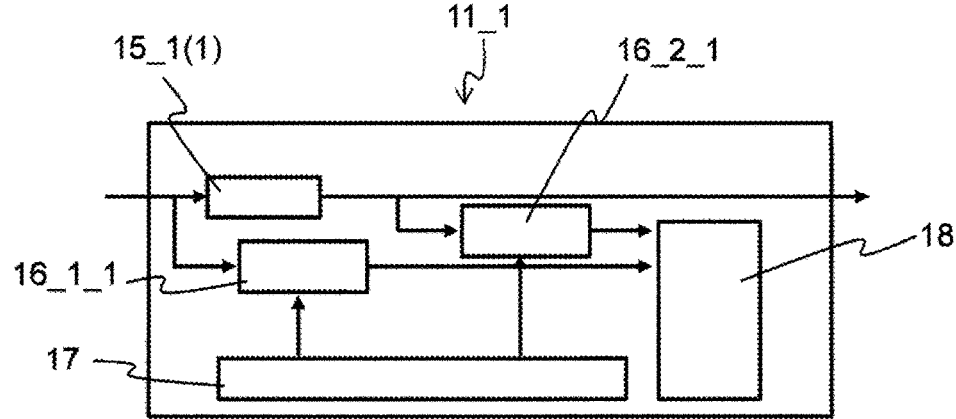
FIG. 3A is a diagram for explaining expansion and contraction of a calculation unit in the computer system according to the first embodiment of the present invention.
Figure 3B:
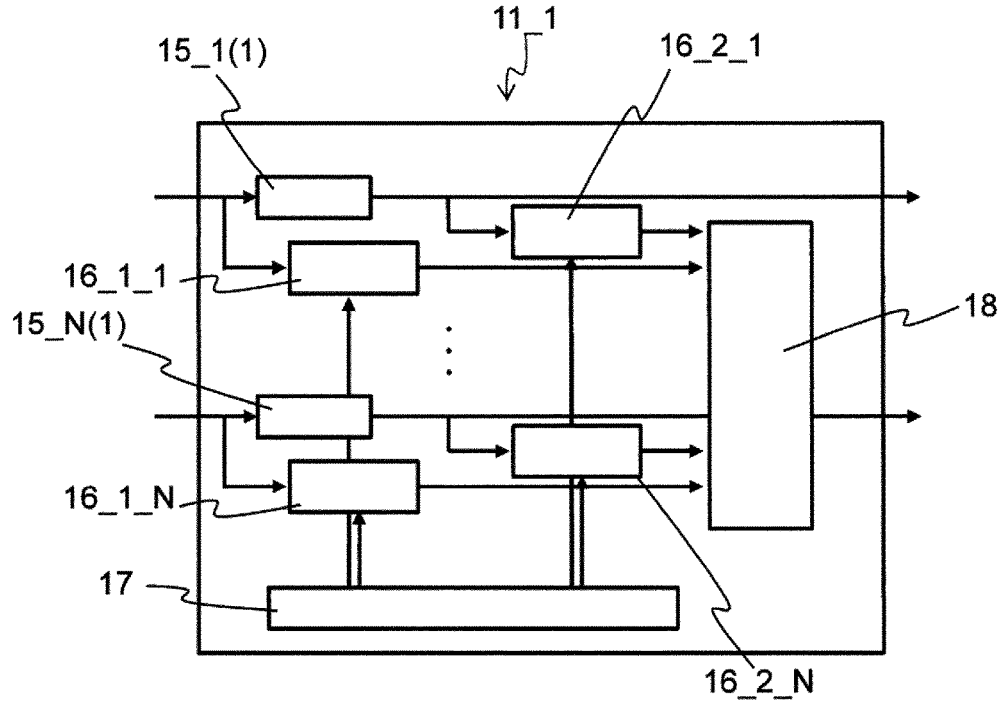
FIG. 3B is a diagram for explaining expansion and contraction of a calculation unit in the computer system according to the first embodiment of the present invention.

Furthermore, for example, in the calculation unit 11_1 shown in FIG. 3A, calculators 15_1(1) to 15_N(1) can be added by arranging (adding) new event generators 16_1_2 to 16_2_N and connecting them to the timestamp unit 17 and the trace buffer 18 as shown in FIG. 3B.

Furthermore, the calculators 15_1(1) to 15_N(1) can be deleted by deleting the event generators 16_1_2 to 16_2_N in the calculation unit 11_1.

When adding calculators 15_1(1) to 15_N(1), a plurality of event generators 16_1_1 to 16_2_N can be arranged at arbitrary locations in the trace units 14_1 to 14_N.

Here, the event generators 16_1_1 to 16_2_N may be arranged both before the input stage and after the output stage of the calculators 15_1(1) to 15_N(1) and may be arranged either before the input stage or after the output stage.

When deleting the calculators 15_1(1) to 15_N(1), the event generators 16_1_1 to 16_2_N before and after the calculators 15_1(1) to 15_N(1) may be deleted in the trace units 14_1 to 14_N.

Here, the event generators both before the input stage and after the output stage of the calculators 15_1(1) to 15_N(1) to be deleted may be deleted, and the event generator either before the input stage or after the output stage may be deleted.

According to the present embodiment, since a plurality of event generators can be added at any location, by newly adding only the event generator, it is possible to easily add a new calculator inside the calculation unit. It is possible to measure the processing time in the calculator and collect trace data.

In addition, since a plurality of event generators can be deleted from an arbitrary location, if only an event generator is deleted, calculators can be easily deleted inside the calculation unit.

Moreover, when adding a calculator, the circuit scale can be reduced and power consumption can be reduced compared to the case where all of the event generator, the timestamp unit, and the trace buffer are added.

Furthermore, when deleting the calculator from the calculation unit, the event generators arranged before and after the calculator may be deleted. At this time, trace data related to the event generator may be deleted. Furthermore, the trace data attached to the event detected by the event generator to be deleted does not necessarily have to be deleted.

First Example

Figure 4A:
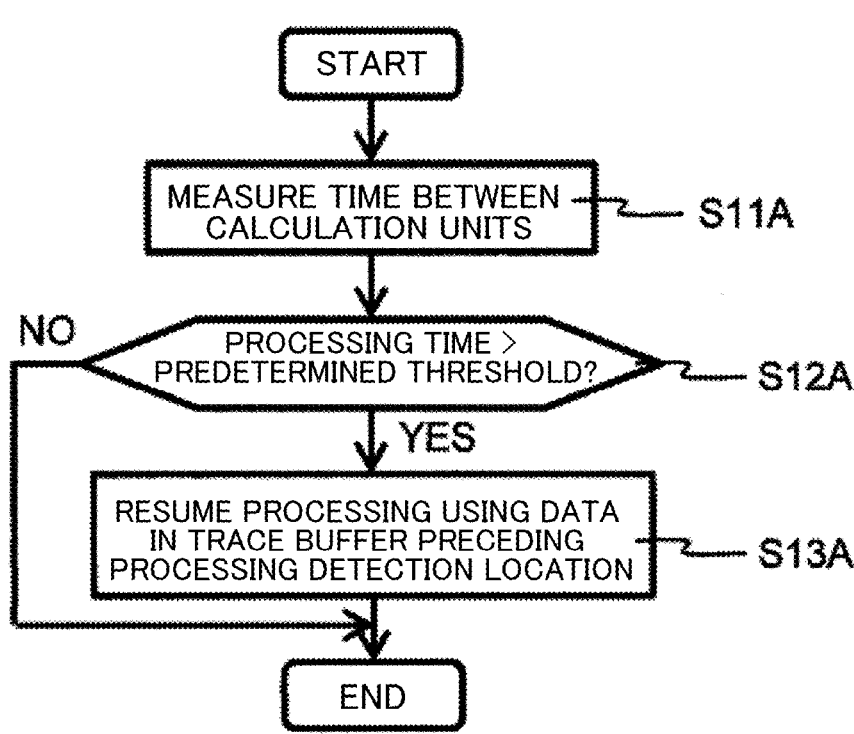
FIG. 4A is a flowchart diagram for explaining a computer system control method according to a first example of the present invention.
Figure 4B:
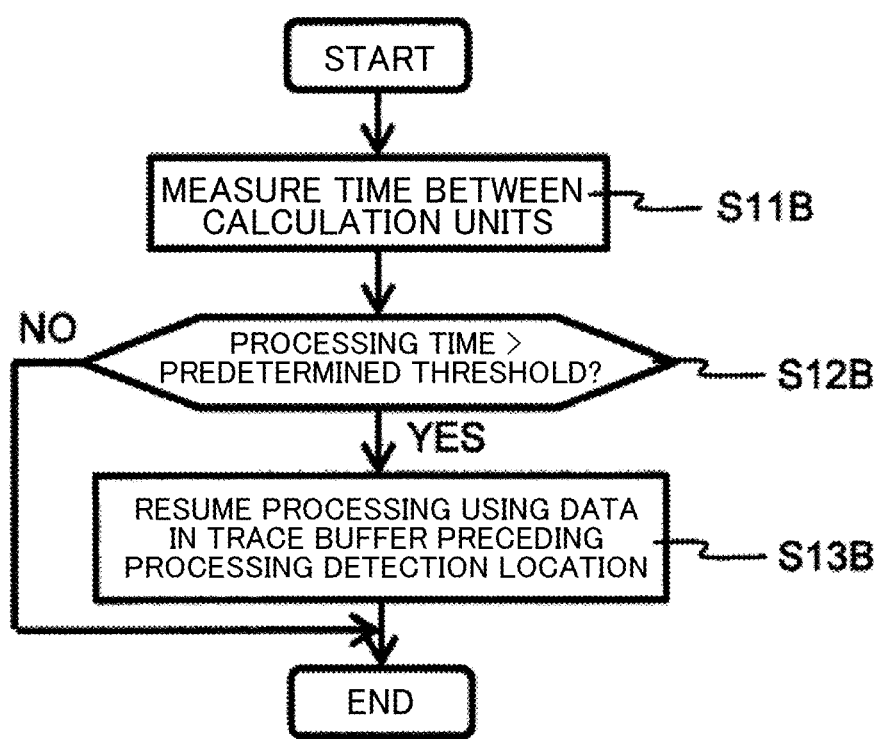
FIG. 4B is a flowchart diagram for explaining the computer system control method according to the first example of the present invention.

A the method for controlling the computer system 10 according to the first example of the present invention will be described with reference to FIGS. 4A and 4B.

In the present example, in the computer system 10, the trace data recorded by the trace units 14_1 to 14_N of the calculation units 11_1 to 11_N is used to efficiently restart processing when a trouble occurs. Here, the trouble includes a packet loss that can normally occur, a stack of processing in the internal functional blocks of the calculation units 11_1 to 11_N, and the like.

In the computer system 10, for example, the trace unit 14_1 of the calculation unit 11_1 records, as arbitrary trace data in the trace buffer 18, a timestamp value, an instance ID (information indicating the location where an event is detected), and arbitrary data.

As an example of the method for controlling the computer system 10 according to the present example, a case where the host unit 12 performs control (management) will be described with reference to FIG. 4A.

First, the host unit 12 monitors the trace buffer 18 of the computer system at a predetermined cycle and measures the processing time within the calculation unit (step S11A).

Here, in measurement of the processing time, first, the host unit 12 reads (acquires), from the trace buffer 18, a first timestamp value and a second timestamp value triggered by the detection of predetermined events (first event and second event) in the event generator 16_1_1 (first event generator) on the input side of the calculator 15_1(1) and the event generator 16_2_1 (second event generator) on the output side of the calculator 15_1(1).

Subsequently, the host unit 12 calculates the processing time from the difference between the first timestamp value and the second timestamp value.

In this way, the processing time of an arbitrary location (section, for example, the calculator 15_1(1)) is obtained by a difference between the times (the first timestamp value and the second timestamp value) when the input data passes through the event generators arranged at arbitrary locations (section, for example, before and after the calculator 15_1(1)).

Next, the measured processing time is compared with a preset threshold (step S12A). As a result, if the processing time is longer than a predetermined threshold, it is determined that a trouble has occurred.

Finally, when a trouble has occurred, the processing detection location is grasped from the instance ID, and processing is resumed using any data recorded in any trace buffer 18 preceding the processing detection location (step S13A).

Furthermore, as an example of the method for controlling the computer system 10 according to the present example, a case where the calculation units 11_1 to 11_N perform control (management) will be described with reference to FIGS. 4B and 4C.

First, the calculation units 11_1 to 11_N record trace data, monitor the trace buffer 18 at a predetermined cycle, and measure the time (hereinafter referred to as "processing time between calculation units") taken until the data is input to the calculator 15_1(2) of the next-stage calculation unit (for example, the calculation unit 11_2) after the timestamp value is recorded in the trace buffer 18 of an arbitrary calculation unit (for example, the calculation unit 11_1) (step S11B).

Figure 4C:
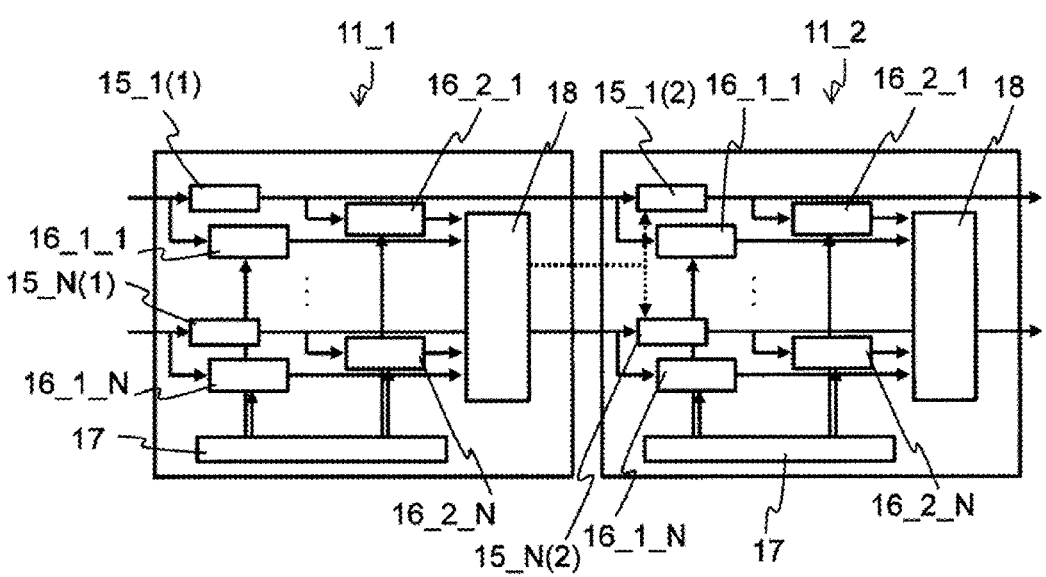
FIG. 4C is a diagram for explaining the computer system control method according to the first example of the present invention.

In the measurement of the processing time between the calculation units, for example, as shown in FIG. 4C, first, the event generator 16_2_1 preceding the trace buffer 18 of the calculation unit 11_1 acquires the timestamp value (first timestamp value), and the timestamp value is recorded in the trace buffer 18 of the calculation unit 11_1.

Subsequently, a notification signal is transmitted from the trace buffer 18 of the calculation unit 11_1 to the calculator 15_1(2) of the calculation unit 11_2 (dotted arrow in the figure). Triggered by this signal, the data is transferred from the calculator 15_1(1) of the calculation unit 11_1 to the calculator 15_1(2) of the calculation unit 11_2.

Subsequently, triggered by the detection of the event of the data input to the calculator 15_1(2) of the calculation unit 11_2, the event generator 16_1_1 preceding the calculator 15_1(2) of the calculation unit 11_2 acquires the timestamp value (the second timestamp value) and the timestamp value is recorded in the trace buffer 18 of the calculation unit 11_2.

The processing time between the calculation units is measured from the difference between the first timestamp value and the second timestamp value.

Next, the measured processing time is compared with a preset threshold (step S12B). As a result, if the measured time is longer than a predetermined threshold, it is determined that a trouble has occurred.

Finally, when a trouble has occurred, the process is resumed using arbitrary data recorded in any of the trace buffers 18 preceding the processing detection location grasped by the instance ID recorded in the trace buffer 18 (step S13B).

Here, an example of measuring the processing time using the timestamp value recorded in the trace buffer is shown, but the timestamp value acquired by the event generator may be used directly to measure the processing time.

As described above, in the computer system control method according to the present example, an event generator arranged at an arbitrary position detects a predetermined event and acquires one timestamp value triggered by this detection. An event generator arranged at another position similarly acquires other timestamp values, calculates the difference between one timestamp value and another timestamp value, determines the occurrence of a trouble, and resumes processing.

According to the computer system control method according to the present example, by using the trace data recorded by the trace units 14_1 to 14_N, even if a trouble occurs, the processing can be resumed by tracing back to the location where the system is operating normally without resuming the processing from the beginning.

In addition, the host unit 12 manages the trigger for resuming the trace data processing. Alternatively, it may be managed by the calculation units 11_1 to 11_N.

Furthermore, the resumption of processing does not necessarily have to be limited to a specific functional block. For example, processing may be resumed by tracing back to the input of the calculation unit.

In the present example, an example of grasping the processing detection location by the instance ID was shown, but the processing detection location may be derived using a preset processing speed of a calculator and a measured timestamp value without being limited to this.

In the present example, an example of using the processing time in order to grasp the occurrence of a trouble is shown, but the data flow rate (described later) or the like may be used without being limited to this.

In the present example, the trace data may have a data type and an event type. Furthermore, trace data may be recorded for each data type or event type.

Second Example

A computer system control method according to the second example of the present invention will be described with reference to FIG. 5. In the present example, in the computer system, the trace units 14_1 to 14_N of the calculation units 11_1 to 11_N are used to perform system quality control (state management/health check).

In the computer system 10, for example, the trace unit 14_1 of the calculation unit 11_1 includes a plurality of event generators 16_1_1 to 16_2_N.

Figure 5:
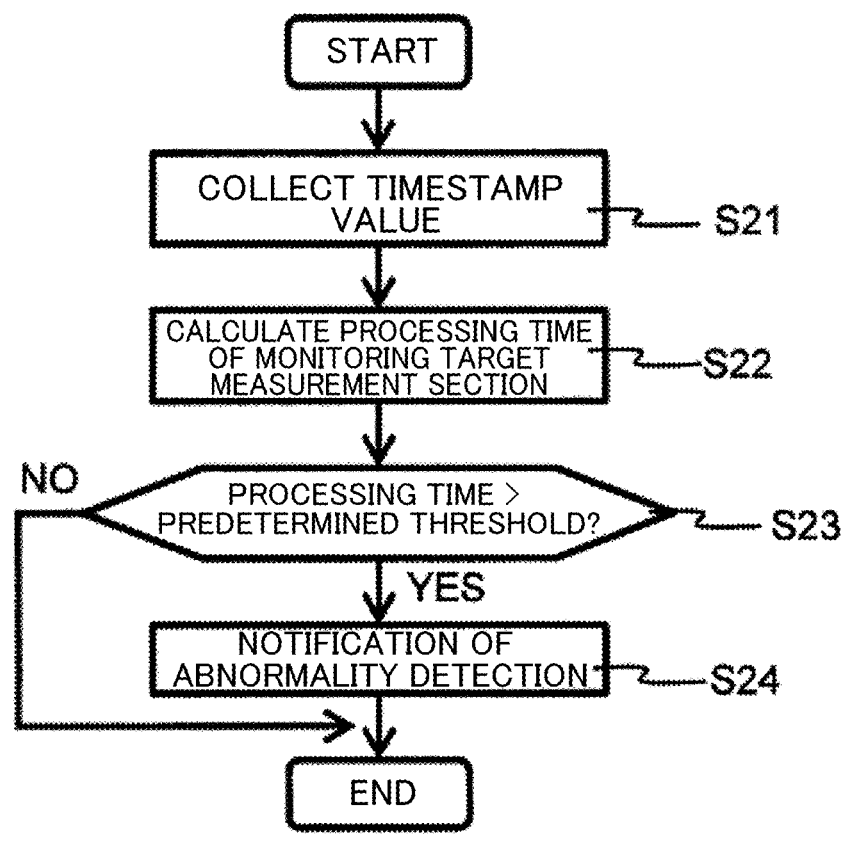
FIG. 5 is a flowchart diagram for explaining a computer system control method according to a second example of the present invention.

FIG. 5 shows a flowchart of the method for controlling the computer system 10 according to the present example.

First, for example, the calculation unit 11_1 of the computer system 10 uses a plurality of event generators 16_1_1 to 16_2_N to collect times when data passes through each of the event generators 16_1_1 to 16_2_N (step S21).

Specifically, the calculation unit 11_1 collects timestamp values (for example, a first timestamp value and a second timestamp value) based on the detection of a predetermined event in the event generators (for example, the event generator 16_1_1 and the event generator 16_2_1) arranged at different locations.

Next, by obtaining the difference between the collected first timestamp value and second timestamp value, the time required for data to pass through the specific section in the calculation unit 11_1, that is, the processing time is calculated (step S22).

Next, the processing time is compared with a preset threshold (step S23).

As a result of the comparison, if the processing time is longer than the threshold, the abnormality detection of the computer system 10 is notified (step S24).

Thus, according to the computer system control method according to the present example, it is possible to monitor whether the computer system is operating normally.

In addition, it is not necessary to perform time analysis processing on all pieces of data. For example, the time (processing time) required for data to pass through a specific section in the calculation units 11_1 to 11_N is observed at predetermined measurement intervals, and it is determined whether the processing time falls within a predetermined range or whether it is longer than a predetermined threshold. In this way, it is possible to monitor whether the computer system is operating normally.

Alternatively, test data may be input and the time required for this data to pass through the calculation units 11_1 to 11_N may be analyzed.

In the present example, an example of measuring the processing time by directly using the timestamp value acquired by the event generator was shown, but after recording the timestamp value in the trace buffer, and the processing time may be measured using the timestamp value recorded in the trace buffer.

In the present example, an example of grasping the state of the computer system using the processing time has been shown, but the present invention is not limited to this, and the data flow rate or the like may be used.

In the present example, an example in which the calculation unit controls the computer system has been shown, but the host unit may control the computer system.

In the present example, the trace data may have a data type as well as a timestamp value. Furthermore, it may have an instance ID, an event type, and arbitrary data. Furthermore, trace data may be recorded for each data type or event type.

Third Example

A method for controlling the computer system 10 according to the third example of the present invention will be described with reference to FIG. 6. In the present example, in the computer system 10, flow management of the computer system 10 is executed using the trace units 14_1 to 14_N of the calculation units 11_1 to 11_N.

In the computer system 10, the trace units 14_1 to 14_N of the calculation units 11_1 to 11_N record timestamp values and instance IDs (information indicating locations where events are detected) as trace data in the trace buffer 18, and the host unit 12 reads the trace data.

Figure 6:
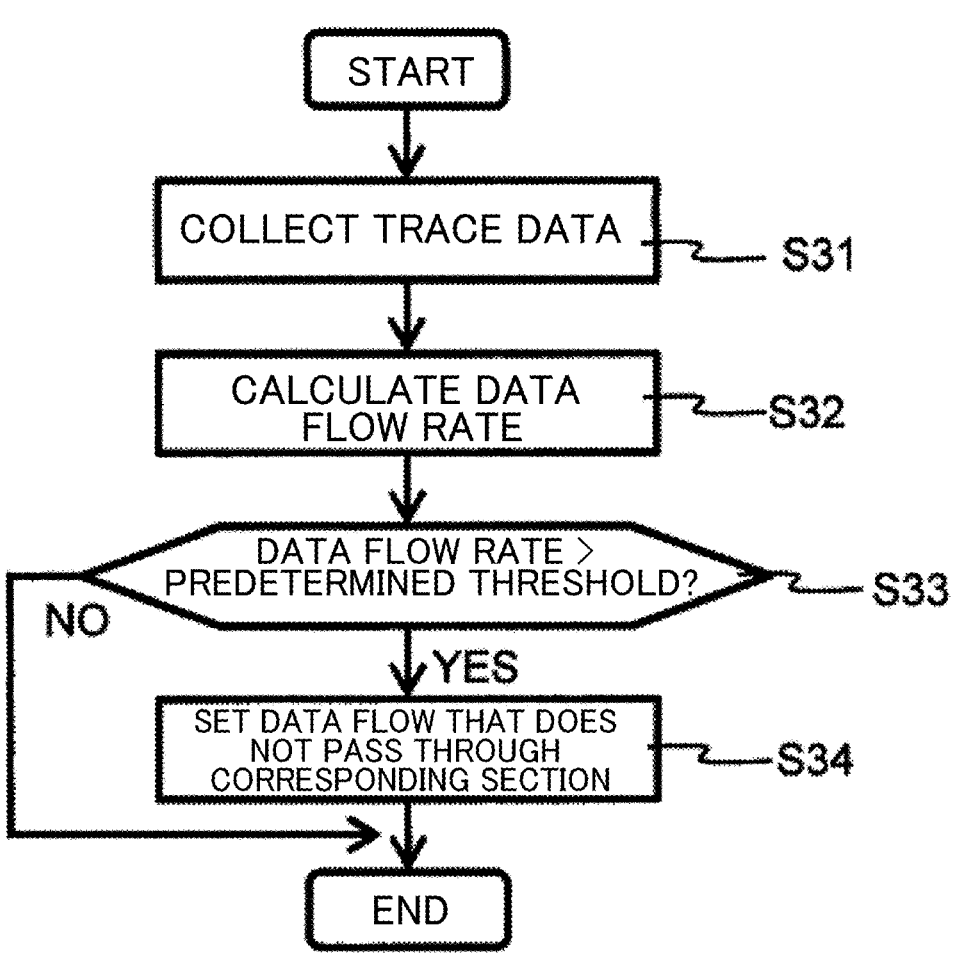
FIG. 6 is a flowchart diagram for explaining a computer system control method according to a third example of the present invention.

FIG. 6 shows a flowchart diagram of the method for controlling the computer system 10 according to the present example.

First, the host unit 12 collects, as trace data from the trace buffer 18, for example, a timestamp value and an instance ID (information indicating the location where the event is detected) obtained by the event generator 16_1 at an arbitrary location in different events (step S31).

More specifically, the event generator 16_1 collects the timestamp values of the beginning and the end stored in the trace buffer 18, which are acquired using an event of passing data, such as detection of the beginning and the end, as a trigger.

Next, the difference between the timestamp value of the beginning and the timestamp value of the end is calculated as the data passing time.

Next, the data amount (data flow rate) per unit time at a predetermined location is calculated by dividing a preset data amount of input data (or output data) by the data passing time (step S32).

Next, the data flow rate is compared with a preset predetermined threshold (step S33).

If the result of the comparison is that when the data flow rate is greater than the threshold, the data flow (path) is set to avoid data concentration. For example, when assigning a path, a path is set by avoiding a path exceeding a predetermined threshold grasped by an instance ID (information indicating a location where an event is detected) (step S34).

As described above, according to the computer system control method according to the present example, the data flow (path) can be set so as to avoid data concentration.

In the present example, an example of measuring the processing time using the timestamp value recorded in the trace buffer has been shown, but the timestamp value acquired by the event generator may be used directly to measure the processing time.

Furthermore, although an example in which the host unit controls the computer system has been shown, the calculation unit may control the computer system.

Furthermore, if the trace data has information about the data type, the host unit 12 can grasp the operating status for each data type.

As a result, when data is concentrated only in a specific flow, the computer system 10 can avoid the concentration of data by transferring data from the flow to another flow with a lower load, and perform flow management.

Furthermore, the trace data may record instance IDs, event types, and arbitrary data. Furthermore, trace data may be recorded for each data type or event type.

Furthermore, by detecting a fault that has occurred in a specific flow or a specific location, the flow can be managed so as to set a path bypassing the flow when a fault occurs.

Furthermore, if a trouble occurs in a calculation unit that has multiple flows with different data paths, replacement, resetting, analysis, and the like of the calculation unit can be performed after saving flows other than the flow to other calculation units.

<Measurement Example of Calculation Unit>

An example of measuring the processing time and the data flow rate in the calculation unit in the method for controlling the computer system 10 according to the present example will be described with reference to FIGS. 7A and 7B.

In this measurement example, for example, input data is observed by the event generator 16_1_1 preceding the calculator 15_1(1), and input data is observed by the event generator 16_2_1 in the subsequent stage.

Triggered by an event when the beginning of the input data passes through the event generator 16_1_1, the event generator 16_1_1 acquires the timestamp value of the beginning of the input data.

Similarly, triggered by an event when the end of the input data passes through the event generator 16_1_1, the event generator 16_1_1 acquires the timestamp value of the end of the input data.

On the other hand, triggered by an event when the beginning of the output data passes through the event generator 16_2_1, the event generator 16_2_1 acquires the timestamp value of the beginning of the output data.

Similarly, triggered by an event when the end of the output data passes through the event generator 16_2_1, the event generator 16_2_1 acquires the timestamp value of the end of the output data.

FIG. 7A shows an example of trace data. FIG. 7A shows timestamp values (Timestamp:Dec, Timestamp:ox), instance ID (Ins), event ID (Evt), decoded event ID (Dec), TID, and event data (EventData).

In the decoded event ID (Dec), H indicates the beginning of data and L indicates the end of data.

The data amount of input data and output data is 1 MB. Furthermore, the operating frequency of the calculation units 11_1 to 11_N is 250 MHz (4 ns/cycle).

The timestamp value (Timestamp:Dec) of the beginning of the input data is "406514" and the instance ID (Ins) is "10" (the upper part of the dotted square 41). Furthermore, "H-R-" of the event ID (Dec) indicates the passing of the beginning of the data as event occurrence.

Similarly, the timestamp value (Timestamp:Dec) of the beginning of the output data is "401656" and the instance ID (Ins) is "11" (the lower part of the dotted square 41). Furthermore, "H-R-" of the event ID (Dec) indicates the passing of the beginning of the data as event occurrence.

Furthermore, the timestamp value (Timestamp:Dec) of the end of the input data is "547791" and the instance ID (Ins) is "10" (the upper part of the dotted square 42). Furthermore, "-LR-" of the event ID (Dec) indicates the passing of the end of data as event occurrence.

Similarly, the timestamp value (Timestamp:Dec) of the beginning of the output data is "547794" and the instance ID (Ins) is "11" (the lower part of the dotted square 42). Furthermore, "-LR-" of the event ID (Dec) indicates the passing of the end of data as event occurrence.

Figure 7B:
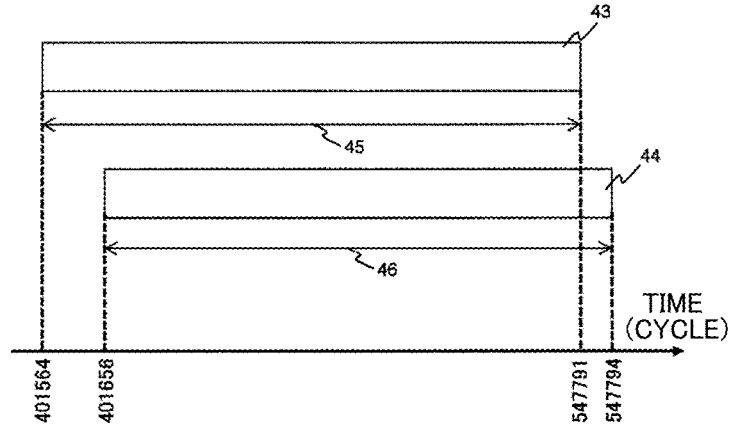
FIG. 7B is a diagram for explaining an example of a computer system control method according to the first embodiment of the present invention.

FIG. 7B schematically shows the relationship between the input data 43 and the output data 44. The time for the input data 43 to pass through the event generator 16_1_1 is calculated as 146227 cycles (=584.9 usec) from the difference (arrow 45) between the end timestamp value (547791 cycles) and the beginning timestamp value (401564 cycles). Therefore, 1 MB/584.9 usec (=approximately 1.8 GB/sec) is obtained as input throughput, that is, data flow rate.

Similarly, the input throughput, that is, the data flow rate can be calculated from the difference (arrow 46) between the end timestamp value and the beginning timestamp value of the output data 44.

In this manner, the data flow rate is obtained by dividing the data amount by the difference between the beginning and end timestamp values of the data in the calculation unit.

Furthermore, as the processing time (latency), 92 cycles are obtained from the difference between the timestamp values at the start of output and the start of input, that is, the difference between the timestamp value (401656 cycles) of the beginning of the output data 44 and the timestamp value (401564 cycles) of the beginning of the input data 43.

In this manner, the processing time of the input data in the calculation unit is obtained from the difference between the timestamp values at the start of output and the start of input.

As described above, in the computer system control method according to the present invention, the timestamp values of the input data and the output data can be used to obtain the data processing time and data flow rate.

Effect

According to the computer system and the control method therefor according to the embodiments and examples of the present invention, when the calculation processing in the computer system stops midway or when the processing is not completed normally, it is possible to easily detect and identify the processing unit whose processing has stopped among the plurality of calculation units.

Furthermore, since the trace buffer 18 records the data, the processing can be restarted from the middle. As a result, there is no need to repeat the already executed processing from the beginning. Moreover, the processing time can be shortened when the processing is not completed normally.

In addition, since the host unit 12 can centrally manage the state of each calculation unit, for example, it is possible to set a flow of data that does not pass through a calculation unit whose processing has stopped, thereby reducing the number of pieces of data whose processing is not normally completed.

In addition, since events can be detected for each data type (user ID, session ID, stream ID, service ID) and trace data can be accumulated, quality control and trouble analysis can be easily performed by focusing on specific data types.

Furthermore, since the trace units 14_1 to 14_N are provided independently of the calculation units, the abnormal state of the calculation units can be maintained.

In addition, the flow can be managed at the granularity of each user (each session).

In addition, since an event generator for event detection can be inserted into an arbitrary portion, it is possible to detect troubles that occur only in a specific flow.

Second Embodiment

A computer system and a control method therefor according to the second embodiment of the present invention will be described with reference to FIG. 8. A computer system 10 according to the present embodiment has a configuration similar to that of the first embodiment.

In the computer system 10 according to the first embodiment, the trace buffer 18 overflows, making it difficult to record trace data. Therefore, it is necessary to erase the trace data.

<Computer System Control Method>

Figure 8:
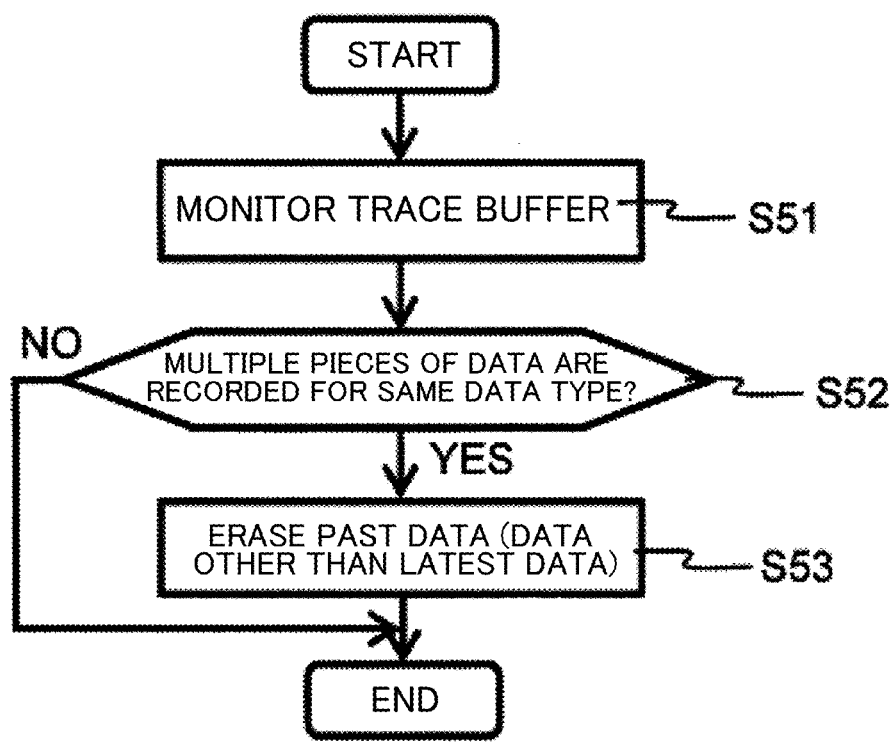
FIG. 8 is a flowchart diagram for explaining a computer system control method according to a second embodiment of the present invention.

FIG. 8 shows a flowchart of the computer system control method according to the present embodiment.

In the computer system according to the present embodiment, at least the data type is recorded as trace data in the trace buffer 18 together with the timestamp value. Here, instance IDs, event types, and arbitrary data may be recorded as trace data. Alternatively, trace data may be recorded for each data type or event type.

First, the host unit 12 monitors the trace buffers 18 of the calculation units 11_1 to 11_N at predetermined intervals (step S51).

Next, it is determined whether a plurality of pieces of trace data for the same data type are recorded in the trace buffer 18 (step S52).

As a result of determination, when a plurality of pieces of trace data for the same data type are recorded in the trace buffer 18, the trace data with the latest timestamp value among the plurality of pieces of trace data is held (recorded), and trace data recorded in the past (trace data other than the latest trace data) is erased (step S53). Thus, the detection time of the event recorded in the trace buffer is erased based on the detection time of the event.

According to the computer system and the control method therefor according to the present embodiment, even if the storage capacity of the trace buffer 18 is finite, buffer overflow can be suppressed and the physical buffer capacity can be reduced.

Moreover, since it is not necessary to mount an excessive amount of buffers, the power consumption of the calculation unit can be reduced, and the power efficiency can be improved.

In addition, since trace data is recorded for each data type (user ID, session ID, stream ID, service ID), it is possible to provide a highly flexible computer system, such as increasing reliability by retaining trace data for a specific data type (for example, the highest priority service) for a relatively long time.

Furthermore, the present embodiment naturally has the same effect as the first embodiment.

Modification 1 of Second Embodiment

A computer system and a control method therefor according to Modification 1 of the second embodiment of the present invention will be described. A computer system 10 according to this modification has a configuration similar to that of the first embodiment.

In the computer system according to this modification, at least the data type is recorded as trace data in the trace buffer 18 together with the timestamp value. Here, instance IDs, event types, and arbitrary data may be recorded as trace data. Alternatively, trace data may be recorded for each data type or event type.

In this modification, before the calculation units 11_1 to 11_N of the computer system 10 record (write) the trace data (latest trace data) received from the event generators 16_1_1 to 16_2_N in the trace buffer 18, it is determined whether trace data of the same data type as the latest trace data is recorded in the trace data already held by the trace buffer 18.

As a result of determination, if trace data of the same data type is recorded, the data already held (data other than the latest data) is erased, and the latest trace data is subsequently recorded, that is, the latest trace data is overwritten. Thus, the detection time of the event recorded in the trace buffer is overwritten based on the detection time of the event.

Here, a flag or the like may be added to prevent overwriting, and whether overwriting is permitted or not may be determined based on the presence or absence of the flag.

In this way, the same effects as in the present embodiment are obtained.

Modification 2 of Second Embodiment

A computer system and a control method therefor according to Modification 2 of the second embodiment of the present invention will be described. A computer system 10 according to this modification has a configuration similar to that of the first embodiment.

In the computer system according to this modification, at least a timestamp value is recorded in the trace buffer 18 as trace data. Here, data types, instance IDs, event types, and arbitrary data may be recorded as trace data. Alternatively, trace data may be recorded for each data type or event type.

In this modification, first, the data processed by the calculator 15_1(1) is transmitted from the calculator 15_1(1) of the calculation unit 11_1 in the preceding stage to the calculator 15_1(2) of the calculation unit 11_2 in the subsequent stage.

Next, the calculation unit 11_2 in the subsequent stage sends a reception completion notification to the calculation unit 11_1 in the preceding stage.

Finally, when the calculation unit 11_1 in the preceding stage receives the reception completion notification from the calculation unit 11_2 in the subsequent stage, the data in the trace buffer 18 of the calculation unit 11_1 in the preceding stage is erased.

Alternatively, the calculation unit 11_2 in the subsequent stage may send a reception completion notification to the host unit 12, and the data in the trace buffer 18 of the calculation unit 11_1 in the preceding stage may be erased according to an instruction from the host unit 12.

In this way, the same effects as in the present embodiment are obtained.

Furthermore, in the present embodiment, when the host unit 12 having a larger storage capacity than the trace buffer 18 collects and records data in the trace buffer 18, the data of the trace buffer 18 may be erased by being triggered by the data collection or the completion of collection by the host unit 12.

Furthermore, in the present embodiment, the data in the trace buffer 18 may be erased when a preset time elapses.

Third Embodiment

A computer system and a control method therefor according to the third embodiment of the present invention will be described. A computer system 10 according to the present embodiment has a configuration similar to that of the first embodiment.

In the computer system 10 according to the first embodiment, since a plurality of calculation units operate in conjunction with each other, it is difficult to synchronize the timestamp times measured by the plurality of calculation units.

In particular, when the operating frequencies of the calculation units are different, it is difficult to synchronize the timestamp times because the values of the clock counters based on the operating frequencies are different.

<Computer System Control Method>

Figure 9:
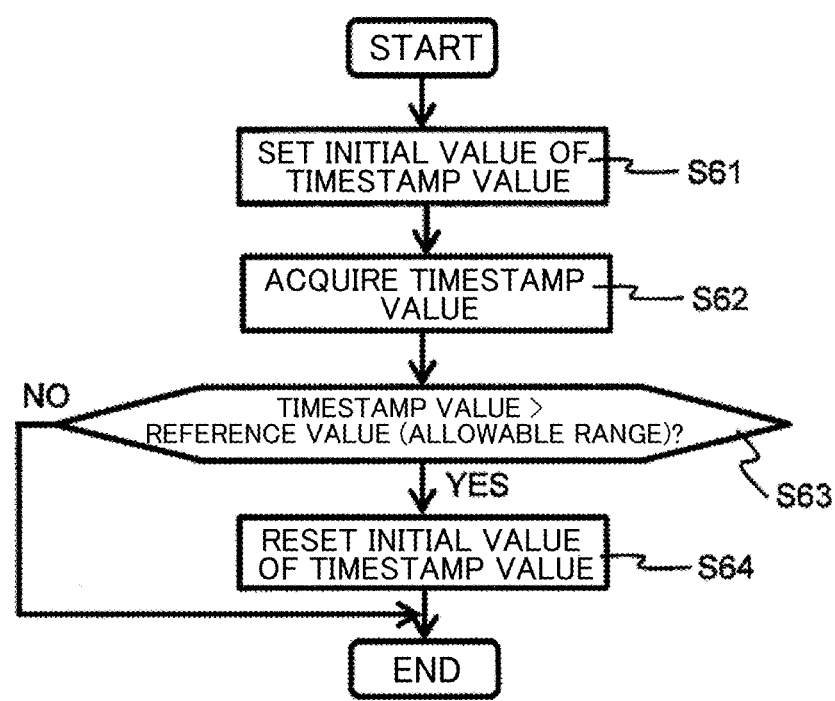
FIG. 9 is a flowchart diagram for explaining a computer system control method according to the second embodiment of the present invention.

In the computer system and the control method therefor according to the present embodiment, the host unit 12 centrally sets the timestamp value to a predetermined value, for example, an initial value. FIG. 9 shows a flowchart of the computer system control method according to the present embodiment.

First, the host unit 12 sets a predetermined value as the initial value of the timestamp value (step S61).

Here, the initial value may be a timestamp value when the calculation units 11_1 to 11_N start measuring the input data.

Alternatively, the host unit 12 may write the start of counting to the timestamp unit 17, and the timestamp value at the start of counting may be used as the initial value.

Next, the calculation units 11_1 to 11_N obtain timestamp values (step S62).

Next, the host unit 12 compares the acquired timestamp value with a predetermined reference value for the timestamp value (step S63).

Here, a predetermined reference value for the timestamp value is set in advance. The predetermined reference value indicates the allowable range of deviation of the timestamp value from a predetermined value, for example, the initial value.

Finally, when the timestamp values of the calculation units 11_1 to 11_N exceed the allowable range of the predetermined reference value, the host unit 12 resets the timestamp values of the calculation units 11_1 to 11_N to a predetermined value, for example, an initial value (step S64).

According to the computer system and the control method therefor according to the present embodiment, when calculation units with different operating frequencies coexist (for example, when the operating frequencies differ depending on the calculation content of the calculation units), since the timestamp values can be handles in a unified manner, it can be easily analyzed after collection of trace data.

In addition, since it is possible to easily synchronize a plurality of calculation units, it is possible to improve the scale-out performance.

In addition, since the host unit 12 centrally sets the timestamp value to a predetermined value, for example, an initial value at the start of measurement or the like, it is possible to easily correct the deviation of the clock counters between the calculation units.

Furthermore, the present embodiment naturally has the same effect as the first embodiment.

Modification 1 of Third Embodiment

A computer system and a control method therefor according to Modification 1 of the third embodiment of the present invention will be described. A computer system 10 according to this modification has a configuration similar to that of the first embodiment.

In this modification, when the frequencies differ among the calculation units 11_1 to 11_N, the host unit 12 adjusts the difference in the operating frequencies of the calculation units 11_1 to 11_N.

For example, if the frequency of the calculation unit 11_1 is 100 MHZ and one clock cycle is 10 nanoseconds, and the frequency of the calculation unit 11_2 is 200 MHZ and one clock cycle is 5 nanoseconds, the host unit 12 synchronizes the timestamp values of the calculation units 11_1 and 11_2 by doubling the timestamp value of the calculation unit 11_1.

Alternatively, the host unit 12 may synchronize the timestamp values of the calculation units 11_1 and 11_2 by multiplying the timestamp value of the calculation unit 11_2 by ½.

Furthermore, after the host unit 12 reads out the trace data, a conversion reference value (for example, 100 MHZ) may be provided, and the counter values of all the calculation units may be converted according to the reference value of 100 MHZ.

As described above, in the computer system and the control method therefor according to this modification, the host unit multiplies the timestamp value of another calculation unit (for example, the calculation unit 11_2) by a coefficient set to the other calculation unit (for example, the calculation unit 11_2) so that the operating frequency of the other calculation unit (for example, the calculation unit 11_2) is the same as the operating frequency of one calculation unit (for example, the calculation unit 11_1). Here, a plurality of other calculation units may be provided. In this way, the difference between the counter values that differ for each calculation unit is adjusted.

As a result, the counter values of the respective calculation units become the same, so that the same effects as in the present embodiment are obtained.

Modification 2 of Third Embodiment

A computer system and a control method therefor according to Modification 2 of the third embodiment of the present invention will be described. A computer system 10 according to this modification has a configuration similar to that of the first embodiment.

In this modification, when the frequencies differ among the calculation units 11_1 to 11_N, the differences in operating frequencies are adjusted in the calculation units 11_1 to 11_N.

First, different conversion values (coefficients) are set in advance according to the frequency for each calculation unit. For example, if the frequency of the calculation unit 11_1 is 100 MHZ and the frequency of the calculation unit 11_2 is 200 MHZ, and the reference value is 100 MHZ, the conversion value (coefficient) of the calculation unit 11_1 is "1", and the conversion value (coefficient) of the calculation unit 11_2 is "½".

Next, before recording the timestamp value in the trace buffer 18, a value obtained by multiplying the timestamp value by a conversion value (coefficient) is recorded.

Furthermore, after recording the timestamp value in the trace buffer 18, conversion may be performed in a similar manner when reading the clock counter value.

As described above, in the computer system and the control method therefor according to this modification, in the preceding stage of the trace buffer of the calculation unit, the timestamp value of another calculation unit (for example, the calculation unit 11_2) is multiplied by a coefficient set to the other calculation unit (for example, the calculation unit 11_2) so that the operating frequency of the other calculation unit (for example, the calculation unit 11_2) is the same as the operating frequency of one calculation unit (for example, the calculation unit 11_1). Here, a plurality of other calculation units may be provided. In this way, the difference between the counter values that differ for each calculation unit is adjusted.

As a result, the counter values of the respective calculation units become the same, so that the same effects as in the present embodiment are obtained.

In the embodiment of the present invention, when the calculation unit executes measurement of processing time, data flow rate, and the like, determination of troubles, and the like, the same may be executed by the calculator of the calculation unit, and a processing function such as measurement, determination, and the like may be separately provided in the calculation unit.

In the embodiment of the present invention, further effects can be obtained by combining the first embodiment, the second embodiment, and the third embodiment.

In the embodiment of the present invention, an example of the structure, dimensions, materials, and the like of each component has been shown in the configuration of the computer system, the control method, and the like, but the present invention is not limited to this. It may be anything as long as it exhibits the functions of the computer system and provides the effects.

INDUSTRIAL APPLICABILITY

The present invention can be applied to computer systems in the field of information processing.

REFERENCE SIGNS LIST

10 Computer system
11_1 to 11_N Calculation unit
12 Host unit
13 Internal communication unit
14_1 to 14_N Trace unit

The invention claimed is:

1. A computer system for processing input data, comprising:
   a plurality of calculation units;
   an internal communication unit connecting the plurality of calculation units for transferring data therebetween;
   a host connected to the plurality of calculation units to control the plurality of calculation units, wherein
   the processed data is configured to be transferred between the plurality of calculation units,
   the calculation unit includes a trace buffer configured to record trace data upon detection of a predetermined event from the input data,
   the trace data has a timestamp value that is the detection time of the event based on the operating frequency of the calculation unit, and
   either the host or the calculation unit is configured to erase the trace data recorded in the trace buffer under a predetermined condition,
   wherein a calculator of one of the plurality of calculation units is configured to process the input data and transfer the input data to a calculator of another calculation unit, the other calculation unit is configured to receive the transferred data and send a reception completion notification, and the one calculation unit is configured to receive the reception completion notification and erase the detection time of the event recorded in the trace buffer of the one calculation unit.

2. The computer system according to claim 1, wherein the trace data further includes a type of the input data, information indicating a location where the event is detected, information distinguishing the content of the event, or arbitrary data.

3. The computer system according to claim 2, wherein when a plurality of pieces of the trace data recorded in the trace buffer belong to the same type of the input data, either the host or the calculation unit is configured to retain latest trace data among the plurality of the pieces of trace data and erase the trace data other than the latest trace data.

* * * * *